(12) United States Patent
Viancin

(10) Patent No.: US 10,596,729 B2
(45) Date of Patent: Mar. 24, 2020

(54) METHOD FOR MANUFACTURING A FLEXIBLE MOLD WITH PERIPHERAL STIFFENER, AND MOLD RESULTING FROM SAID METHOD

(71) Applicant: Jean-Charles Viancin, Hong Kong (HK)

(72) Inventor: Jean-Charles Viancin, Hong Kong (HK)

( * ) Notice: Subject to any disclaimer, the term of this patent is extended or adjusted under 35 U.S.C. 154(b) by 294 days.

(21) Appl. No.: 15/415,962

(22) Filed: Jan. 26, 2017

(65) Prior Publication Data

US 2017/0217051 A1 Aug. 3, 2017

(30) Foreign Application Priority Data

Jan. 28, 2016 (FR) ...................................... 16 50676

(51) Int. Cl.
*B29C 33/38* (2006.01)
*A23P 30/10* (2016.01)
(Continued)

(52) U.S. Cl.
CPC .......... *B29C 33/3842* (2013.01); *A21B 3/132* (2013.01); *A21B 3/136* (2013.01);
(Continued)

(58) Field of Classification Search
CPC ........... A21B 3/13; A21B 3/132; A21B 3/136; A21B 3/138; A47J 37/01; B29C 33/3842; B29C 2043/023; A23G 3/0273
(Continued)

(56) References Cited

U.S. PATENT DOCUMENTS

| | | | | |
|---|---|---|---|---|
| 1,476,910 A | * | 12/1923 | Naugle ................... | A21B 3/132 220/23.2 |
| 1,680,220 A | * | 8/1928 | Langel ................... | A21B 3/132 220/23.2 |

(Continued)

FOREIGN PATENT DOCUMENTS

| | | |
|---|---|---|
| EP | 1132000 A1 | 9/2001 |
| EP | 1197149 B1 | 6/2006 |

(Continued)

OTHER PUBLICATIONS

Machine Translation of FR 1590193 A, Dialog, 3 pages. (Year: 2019).*

*Primary Examiner* — Xiao S Zhao
*Assistant Examiner* — Emmanuel S Luk
(74) *Attorney, Agent, or Firm* — William H. Eilberg

(57) ABSTRACT

A food mold includes a food mold body made of a mold body material, having one or more cells with flexible wall, the cells being open on a common access face itself having a peripheral rim extending radially outward from an inner edge, marking the boundary with the cell or cells and to a free outer edge, the peripheral rim being provided with a peripheral stiffening element in the form of a continuous annular reinforcement with, if necessary, one or more intermediate stiffening elements. The peripheral stiffening element is entirely embedded in the mold body material. Around the peripheral stiffening element, the mold body material has no through passages free or blocked between the peripheral stiffening element and the outer surface of the material.

11 Claims, 8 Drawing Sheets

(51) Int. Cl.
  *B29C 43/02* (2006.01)
  *A21B 3/13* (2006.01)
  *B29K 83/00* (2006.01)
  *B29L 31/00* (2006.01)

(52) U.S. Cl.
  CPC .............. *A21B 3/138* (2013.01); *A23P 30/10* (2016.08); *B29C 43/021* (2013.01); *B29C 2043/023* (2013.01); *B29K 2083/00* (2013.01); *B29K 2995/0082* (2013.01); *B29L 2031/757* (2013.01)

(58) Field of Classification Search
  USPC ...... D7/554.1, 610, 614, 758, 759, 760, 761
  See application file for complete search history.

(56) References Cited

U.S. PATENT DOCUMENTS

| | | | | |
|---|---|---|---|---|
| 1,939,810 | A * | 12/1933 | Green | A21C 3/00 198/606 |
| 2,182,454 | A * | 12/1939 | Sherman | F25C 1/24 220/486 |
| 2,407,021 | A * | 9/1946 | Langel | A21B 3/134 220/23.4 |
| 2,768,765 | A * | 10/1956 | Debs | A21B 3/134 220/23.2 |
| 2,810,338 | A * | 10/1957 | Dawson | A21B 3/132 249/122 |
| 3,032,233 | A * | 5/1962 | Debs | A21B 3/134 220/23.2 |
| D202,825 | S * | 11/1965 | Weiss | D9/760 |
| 3,844,525 | A * | 10/1974 | Parmett | F25C 1/243 220/23.8 |
| D513,019 | S * | 12/2005 | Lion | D15/90 |
| 6,973,872 | B2 * | 12/2005 | Morgan | A21B 3/13 99/428 |
| 7,014,162 | B2 * | 3/2006 | Lion | F25C 1/24 249/121 |
| 7,850,035 | B2 * | 12/2010 | Lion | A21B 3/155 220/573.1 |
| 7,971,748 | B2 * | 7/2011 | Lion | A21B 3/138 220/645 |
| 7,997,439 | B2 * | 8/2011 | Meeks | A21B 3/136 220/573.2 |
| D661,541 | S * | 6/2012 | Braden | D7/354 |
| D689,733 | S * | 9/2013 | Parr | D7/354 |
| 9,510,699 | B1 * | 12/2016 | Miller | A47G 19/12 |
| 2003/0071188 | A1 * | 4/2003 | Bruno | A21B 3/133 249/134 |
| 2004/0036004 | A1 * | 2/2004 | De Groote | A23G 1/226 249/155 |
| 2004/0231527 | A1 * | 11/2004 | Brasset | A21B 3/131 99/426 |
| 2005/0199636 | A1 * | 9/2005 | Liu | A47J 36/02 220/644 |
| 2005/0247212 | A1 * | 11/2005 | Meeks | A21B 3/136 99/426 |
| 2006/0083833 | A1 * | 4/2006 | Pezzana | A21B 3/138 426/512 |
| 2006/0266757 | A1 * | 11/2006 | Camacho | A21B 3/136 220/574 |
| 2007/0080163 | A1 * | 4/2007 | Yeung | A47J 36/04 220/675 |
| 2007/0267374 | A1 * | 11/2007 | Middleton | B29C 45/14336 211/126.1 |
| 2007/0284505 | A1 * | 12/2007 | Kaposi | A21B 3/136 249/144 |
| 2008/0060530 | A1 | 3/2008 | Tetreault | |
| 2008/0173187 | A1 * | 7/2008 | Baker | A47J 37/01 99/422 |
| 2008/0216670 | A1 * | 9/2008 | Schuler | A21B 3/138 99/427 |
| 2008/0217341 | A1 | 9/2008 | Wolever | |
| 2008/0274243 | A1 * | 11/2008 | Fang | A21B 3/13 426/389 |
| 2009/0061128 | A1 * | 3/2009 | Liu | A21B 3/136 428/34.4 |
| 2011/0088567 | A1 * | 4/2011 | Deroulers | A21B 3/138 99/426 |
| 2011/0272415 | A1 * | 11/2011 | Tingley | A21B 3/136 220/573.1 |
| 2011/0283509 | A1 * | 11/2011 | Miller | A47J 45/10 29/428 |
| 2013/0095201 | A1 * | 4/2013 | Bloom | A47J 43/20 425/447 |
| 2014/0373733 | A1 * | 12/2014 | Samwell | A47J 37/01 99/426 |
| 2018/0146684 | A1 * | 5/2018 | Morgan | F24C 15/16 |

FOREIGN PATENT DOCUMENTS

| | | | | |
|---|---|---|---|---|
| FR | | 1590193 | * 4/1970 | .......... A23G 3/0273 |
| FR | | 2822024 A3 | 9/2002 | |

* cited by examiner

METHOD FOR MANUFACTURING A FLEXIBLE MOLD WITH PERIPHERAL STIFFENER, AND MOLD RESULTING FROM SAID METHOD

TECHNICAL FIELD OF THE INVENTION

The present invention relates to food molds, generally used for baking or preparing other foods in the kitchen, or for making ice cubes, comprising a food mold body having one or more cells with flexible wall, the cells being open on a common access face that is oriented upward during use, the common access face being itself limited by a peripheral rim extending radially outward and allowing the food mold to be gripped.

The flexible nature of the wall of the cells facilitates the mold-stripping.

This flexible nature of the wall of the cells does however result in the drawback of a deformation of the food mold during its manipulation by holding it by the peripheral rim, when the food mold consists entirely of a silicone-based flexible material, and when the cells are filled. This drawback is all the more inconvenient in the food molds of large size, for example the professional food molds for collective cooking.

Food molds for cooking are already known in which the peripheral rim is associated with a stiffening element. These molds are described for example in the documents EP 1 132 000 A1 or EP 1 197 149 B1. In a first embodiment, the stiffening element is formed by a metal or plastic wire with circular cross section, overmolded by injection in the silicone forming the peripheral rim, and arranged in proximity to the peripheral zone of the peripheral rim.

In practice, during the manufacturing of these known food molds, the stiffening element is directly incorporated in a shaping mold, then overmolded by silicone introduced into the shaping mold. It is necessary to provide holding means to keep the stiffening element in position in the shaping mold during the melting step of the silicone, otherwise the stiffening element will not generally be covered with silicone. However, the holding means then oppose the presence of silicone in several surface zones of the stiffening element. The result thereof is that, after manufacture, several surface zones of the stiffening element are not covered by the silicone, which creates difficulties during the subsequent use of the food mold in a microwave oven or in a dishwasher.

Document FR 2 822 024 A3 describes a flexible food mold wherein a metal support element is partly wrapped in the mold rim by fusion. That document fails to teach any manufacturing method resulting in the metal support element being entirely embedded in the food mold body material.

Through experiments, the applicant has tried to solve this problem though sealing the surface zones which were free of any silicone, during a rework operation during which an additional molding material is introduced. A first drawback lies however in the fact that the blocked zones remain detectable, either by a slight difference of material color, or by an irregularity of the outer surface of the food mold in line with the blocked zones. A second drawback is due to the fact that the rework operation has to be performed by hand, which prevents a full automation of the food mold manufacturing process, and which introduces a risk of error and of incomplete blocking.

SUMMARY OF THE INVENTION

The present invention aims to avoid the drawbacks of these known food molds, by proposing a novel food mold manufacturing method by virtue of which the whole of the outer surface of the stiffening elements is masked in a reliable, automatable, totally invisible and undetectable manner, making it possible to use stiffening elements made of metal without that disrupting the subsequent use of the food mold in a microwave oven or in a dishwasher.

The present invention thus aims to produce food molds in which the masking of the stiffening elements is reliable, total and undetectable. In particular, the masking of the stiffening elements is produced totally without leaving any irregularity of the outer surface of the food mold remaining.

If necessary, the present invention makes it possible to produce food molds whose wall has at least two zones of different colors.

The invention further aims to ensure, if necessary, a better ergonomy, by facilitating the gripping of the food mold by the peripheral rim.

The invention further aims to increase, if necessary, the heat exchange surface area between the food mold and the atmosphere inside an oven.

To achieve these aims and others, the invention proposes a method for producing a food mold, said method comprising the following steps:

providing a peripheral stiffening element, in the form of a continuous annular reinforcement, and, if necessary, one or more intermediate stiffening elements, applying, on a first face of the peripheral stiffening element, and, if necessary, on a first face of the intermediate stiffening element or elements, a first molding paste, heating under pressure the assembly of stiffening elements and first molding paste thus obtained in a first shaping mold producing an overmolding of the first face of the peripheral stiffening element and, if necessary, of the intermediate stiffening element or elements with the first molding paste, then leaving to cool, turning over the assembly of stiffening elements and first molding paste thus obtained, and arranging, on the second face of the stiffening element or elements, strips of a second molding paste in a volume equal to that of wall of the food mold to be produced, placing the assembly of stiffening elements and first molding paste and second molding paste thus obtained in a second shaping mold and heating it under pressure to produce a food mold body having one or more cells with flexible wall that are open on a common access face, the common access face being itself limited by a peripheral rim extending outwards, the peripheral stiffening element and, if necessary, the intermediate stiffening element or elements being entirely embedded in the molding paste, then leaving to cool.

By virtue of this method, the molding paste is sure to surround the whole of the outer surface of the stiffening element or elements, without leaving any trace of blocking or irregularity apparent on the outer surface of the food mold thus produced.

The excellent quality of the total overmolding obtained guarantees the reliability of the use of the food mold in a microwave oven or in a dishwasher.

Furthermore, the arrangement of the strips of molding paste can be performed relatively easily, which allows the automation thereof. In other words, the method for manufacturing the food mold can thus be entirely automated.

It should be noted that the wording "common access face" is intended to designate the opening face leaving access to said one or more cells, and should apply to food molds having several cells whose openings are arranged on said common access face, as well as to food molds having a single cell whose single opening is arranged on said common access face.

According to one particular embodiment, wherein the food mold comprises supporting feet, the method is such that:
- the peripheral stiffening element initially comprises a continuous metal annular reinforcement integral with beginnings of metal protuberances,
- the first shaping mold includes housings receiving the beginnings of protuberances, preventing the overmolding thereof by the first molding paste during the heating under pressure of the assembly consisting of the peripheral reinforcement and the first molding paste,
- the second shaping mold comprises housings receiving the beginnings of protuberances, preventing the overmolding thereof by the molding paste during the heating under pressure of the assembly consisting of the peripheral reinforcement and the first and second molding pastes.

After the mold-stripping of the second shaping mold, complementary metal structures are fixed onto the beginnings of protuberances, producing supporting feet.

According to another aspect, the present invention proposes a food mold, comprising a food mold body made of a mold body material, having one or more cells with flexible wall, the cell(s) being open on a common access face, the common access face being itself limited by a peripheral rim extending radially outward, the peripheral rim being limited by a top main face, by a bottom main face, by a free outer edge, and by an inner edge marking the boundary with the cell or cells, the peripheral rim being provided with a peripheral stiffening element; according to the invention:
- the peripheral stiffening element is in the form of a continuous annular reinforcement, limited by an inner face and an outer face away from one another according to a width, and limited by two main faces away from one another according to a thickness, the main faces being parallel to the common access face, the width being greater than or substantially equal to the thickness,
- the peripheral rim has a width greater than the width of the continuous annular reinforcement,
- the peripheral stiffening element is entirely embedded in food mold body material,
- around the peripheral stiffening element, the food mold body material has no through passes free or blocked between the peripheral stiffening element and the outer surface of the food mold body material.

The outer surface of the food mold thus produced has no trace of blocking or irregularity.

In practice, the food mold body can be made of a silicone-based material, of food quality, whereas the stiffening element can be made of metal. The silicone-based materials exhibit good properties of flexibility and of resistance to the temperatures generally used in food preparation. For its part, the metal forming the stiffening element confers great stiffness in a small volume.

Preferably, the peripheral stiffening element is edged externally, in at least two opposing gripping zones of the peripheral rim, by a peripheral strip of material forming the food mold body, said peripheral strip producing an increase in width of the gripping zones and exhibiting a greater flexibility than that of the peripheral stiffening element.

The particular position of the peripheral stiffening element in the opposing gripping zones of the peripheral rim, in particular the fact that, the periphery thereof remains set back from the outer edge of the peripheral rim, leaves a peripheral strip of material forming the food mold body remaining, said peripheral strip exhibiting a greater flexibility than that of the peripheral stiffening element, conferring a greater gripping softness which improves ergonomy. At the same time, said peripheral strip of material forming the food mold body exhibits a lower thermal inertia, facilitating the gripping at lower temperature when taken out of an oven.

Preferably, in the two opposing gripping zones of the peripheral rim, the top main face of the peripheral rim is slightly oriented outward, so that it is set back from the common access face.

In this way, the common access face forms the top surface of the food mold in use, considerably facilitating leveling operations for removing excess material from the cells. In particular, the leveling operations can be carried out rapidly and easily using a straight rule or blade.

In the case of food molds of larger size, comprising a large number of cells, it may be advantageous to further reinforce the structure of the food mold body by providing at least one intermediate stiffening element, joining opposing zones of the peripheral stiffening element, said intermediate stiffening element being entirely embedded in the material forming the top wall of the food mold body between adjacent cells.

Thus, the risks of a deformation of the food mold body during use is reduced, such that the common access face remains flat despite the large size of the food mold.

In practice, the food mold according to the invention can advantageously have a rectangular outline, and in this case the intermediate stiffening element can join opposing zones of two long sides of the peripheral stiffening element.

In applications for collective cooking, the food mold body can advantageously having an outline whose length is approximately 60 cm and width is approximately 40 cm, with two intermediate stiffening elements joining respective opposing zones of the two long sides of the peripheral stiffening element, the intermediate stiffening elements being parallel to the short sides of the peripheral stiffening element and dividing the common access face into three transverse strips having mutually similar surface areas.

Such a food mold body then has a large size, and the professional applications of such a food mold demand a guaranteed excellent shape retention of the cells, whereas the large size of the food mold tends on the contrary to degrade the shape of the outline of the cells during the manufacturing of the food mold, because of the material shrinkage.

To further avoid such a deformation of the outlines of the cells, while avoiding the deformations of the flat common access face, the peripheral stiffening element can advantageously be produced in carbon steel and have a cross section of square shape, 6 mm by 6 mm.

Alternatively, in applications for collective cooking, the food mold body can advantageously have an outline whose length is approximately 40 cm and width is approximately 30 cm, with an intermediate stiffening element joining respective opposing zones of the two long sides of the peripheral stiffening element, the intermediate stiffening element being parallel to the short sides of the peripheral stiffening element by dividing the common access face into two transverse strips having mutually similar surface areas.

Such a food mold body then has a smaller size, suited to the shape of certain ovens present in collective kitchens.

In this case, to avoid the deformation of the outlines of the cells, while avoiding the deformations of the flat common access face, it is sufficient for the peripheral stiffening element to be produced in carbon steel and have a cross section of square shape, 4 mm by 4 mm.

According to one advantageous embodiment, the peripheral stiffening element is integral with protuberances extending perpendicularly and away from the common access face, beyond the bottoms of the cells, to form supporting feet by which the food mold can rest on a bearing plane while keeping the bottoms of the cells away from the bearing plane.

In this way, the food mold can rest on the bottom of a convection oven, and the hot air can be circulated over the entire outer surface of the food mold to promote the heat exchange.

BRIEF DESCRIPTION OF THE DRAWINGS

Other objects, features and advantages of the invention will emerge from the following description of particular embodiments, given in relation to the attached figures, among which.

DESCRIPTION OF PREFERRED EMBODIMENTS

Figure 1:
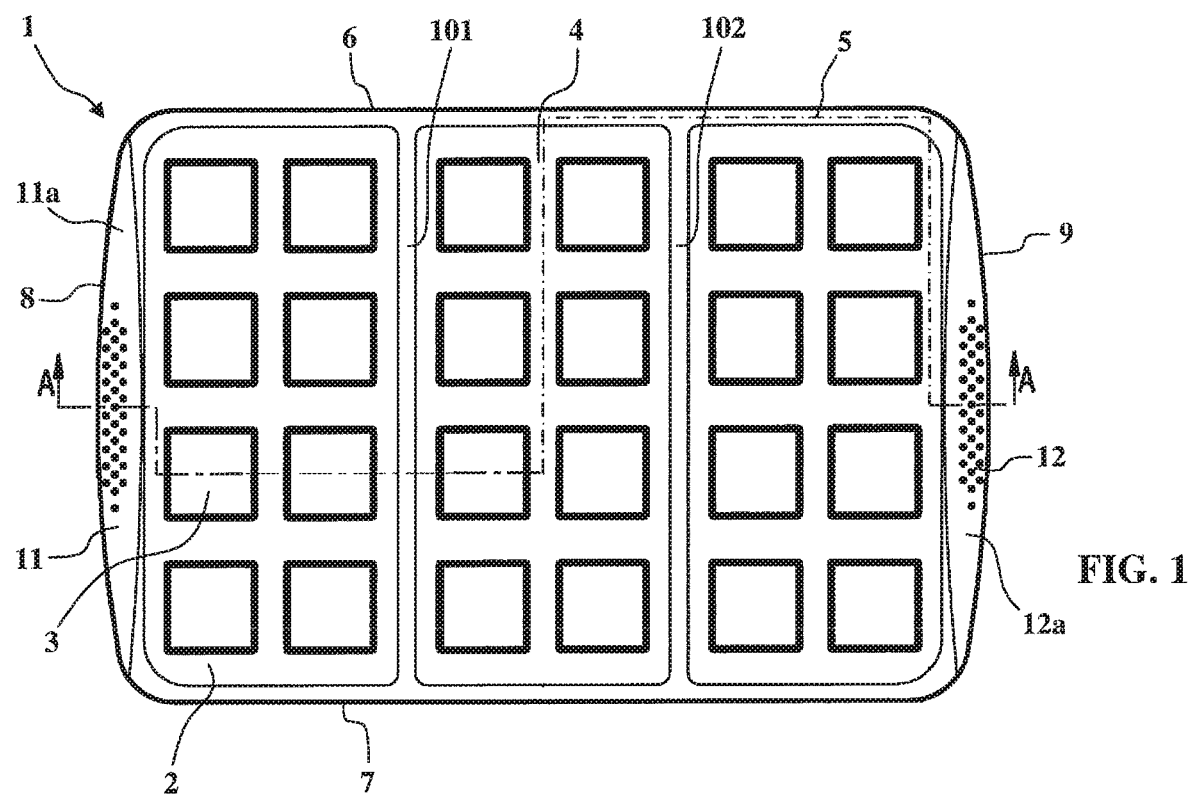
FIG. 1 is a plan view of flexible food mold according to a first embodiment of the present invention.
Figure 2:
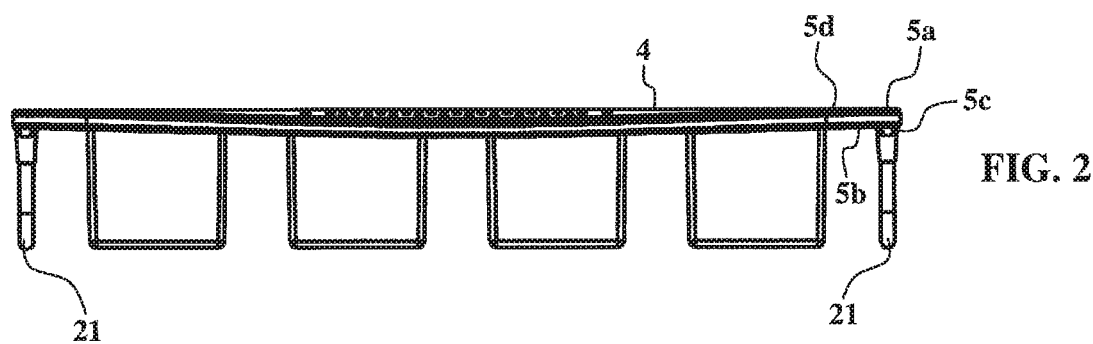
FIG. 2 is a right side view of the food mold of FIG. 1, on a larger scale.

The flexible food mold 1 according to a first embodiment illustrated in FIGS. 1 to 5 is considered first of all.

In this embodiment, the flexible food mold 1 is a food mold for cooking or baking, and comprises a food mold body 2, having 24 identical cells such as the cell 3, distributed regularly on the surface of the food mold 1, in 4 rows and 6 columns. Each cell such as the cell 3 has a cylindrical shape with square outline in which the adjacent sides of the cell are perpendicular and flat. The cell 3 is limited by a bottom 3a and is open on an opening face 3b opposite the bottom 3a.

The opening faces such as the face 3b of all the cells are arranged on a flat common access face 4 which, during the use of the food mold, forms the top face of the food mold.

The common access face 4 is itself limited by a peripheral rim 5 extending radially outward, and itself comprising a top main face 5a, a bottom main face 5b, a free outer edge 5c and an inner edge 5d marking the boundary with the cell or cells 3.

Figure 3:
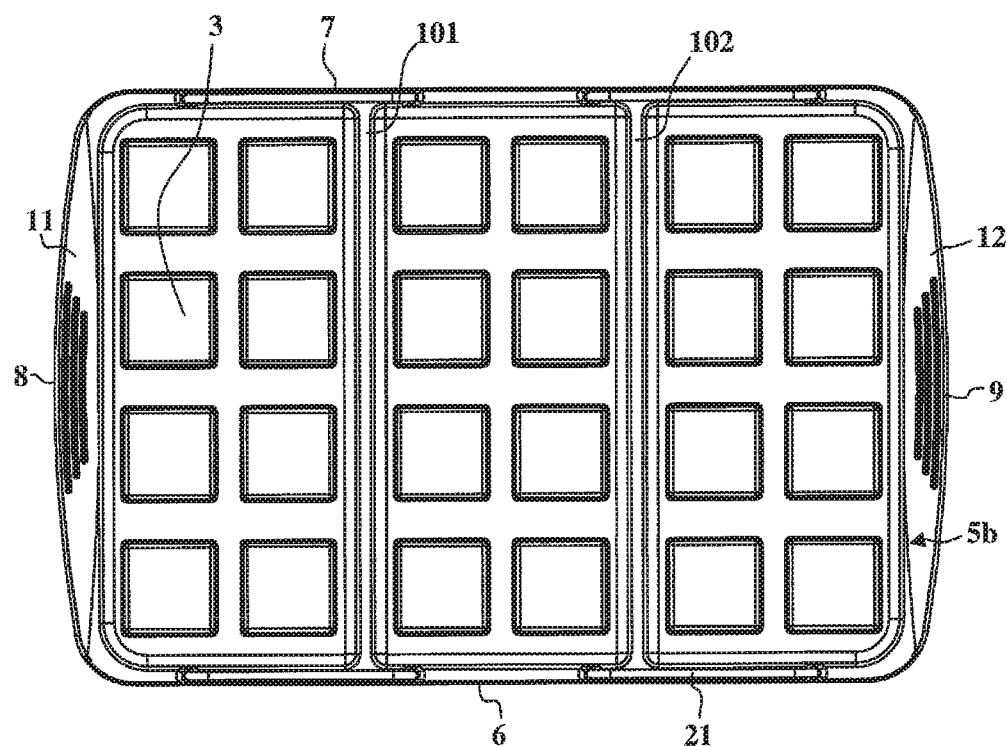
FIG. 3 is a bottom view of the food mold of FIG. 1.

As can be seen in FIGS. 1 and 3, in this embodiment, the food mold 1 has a rectangular outline defined by two long sides 6 and 7 and two short sides 8 and 9. Also in this embodiment, the length of the food mold is approximately 60 cm, and its width is approximately 40 cm.

The food mold body 2 is produced in a silicone-based mold body material, conferring on the walls of the cells 3 a flexibility allowing their deformation during use, for mold-stripping of their content.

Figure 4:
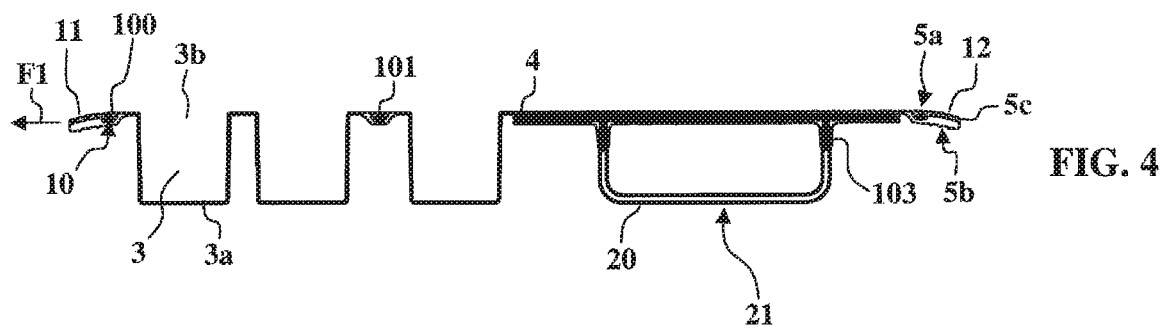
FIG. 4 is a front view in cross section along the line A-A of the food mold of FIG. 1.
Figure 5:
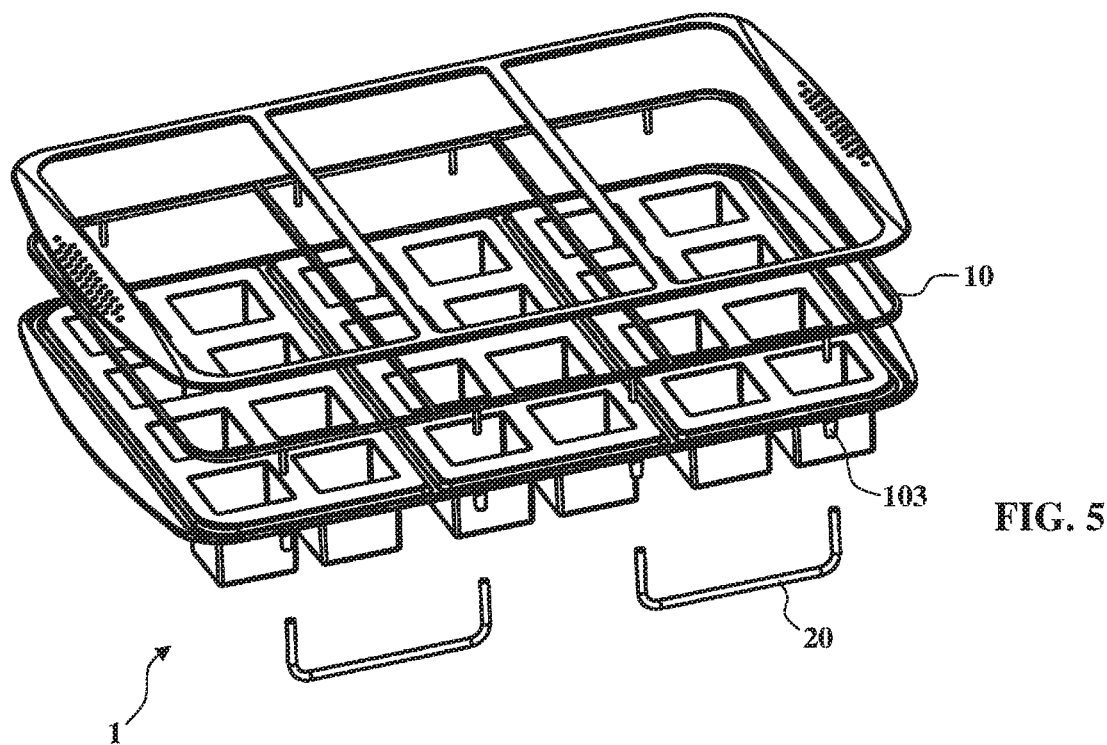
FIG. 5 is a perspective view illustrating the constituent parts of the food mold of FIG. 1.
Figure 6:
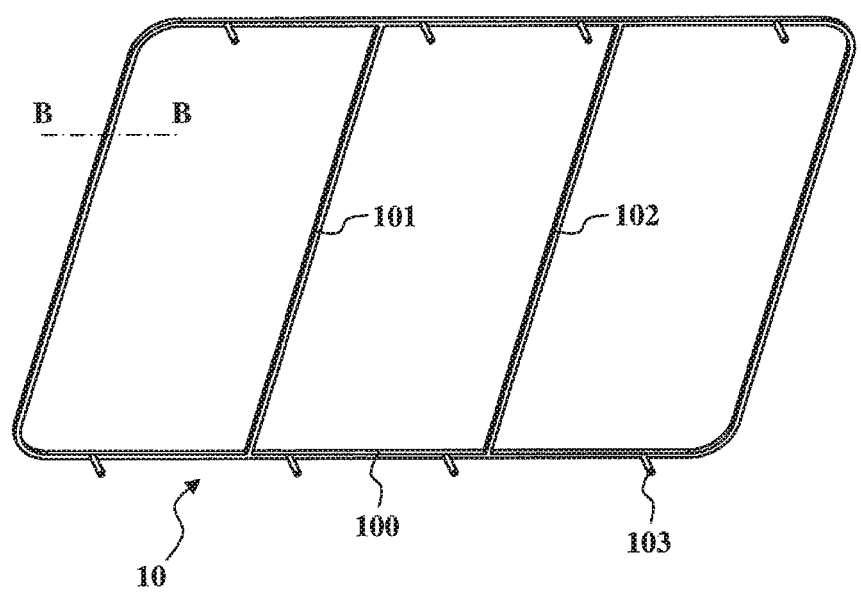
FIG. 6 is a perspective view of the peripheral stiffening element of the food mold of FIG. 1.
Figure 6A:
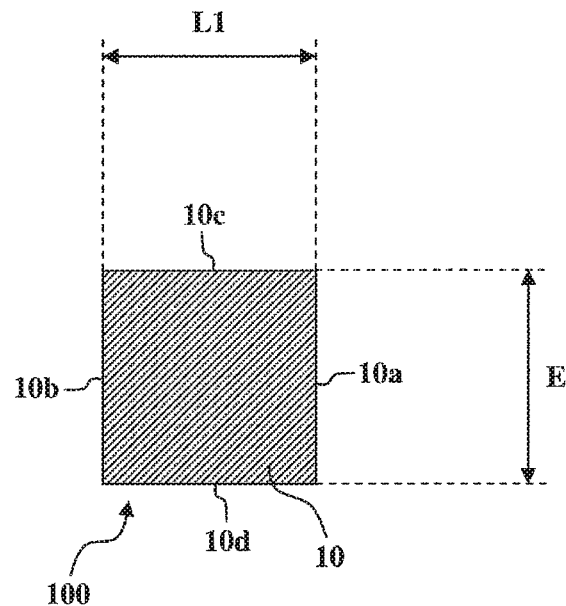
FIG. 6A is a partial cross-sectional view on a larger scale along the plane B-B of FIG. 6.

The peripheral rim 5 is provided with a peripheral stiffening element 10, visible in cross section in FIG. 4, and entirely visible in the exploded view illustrated in FIG. 5, and in FIG. 6. The peripheral stiffening element 10 is in the form of a continuous annular reinforcement 100, the cross section of which is illustrated on a larger scale in FIG. 6A. Thus, the peripheral stiffening element 10 is limited by an inner face 10a and an outer face 10b away from one another according to a width L1, and limited by two main faces 10c and 10d away from one another according to a thickness E. The width L1 is greater than or equal to the thickness E. In practice, for the indicated size of the food mold 1 in this embodiment, that is to say with a length of approximately 60 cm and a width of approximately 40 cm, the thickness E and the width L1 can be each approximately 6 mm.

In the food mold 1, the peripheral stiffening element 10 is positioned such that the main faces 10c and 10d are parallel to the common access face 4. Moreover, the peripheral stiffening element 10 is produced in a metal exhibiting good mechanical rigidity properties, and is entirely embedded in the silicone-based mold body material. For that, the peripheral rim 5 has, at all points, a width greater than the width L1 of the continuous annular reinforcement 100 of the peripheral stiffening element 10, and its thickness is greater than the thickness E of the continuous annular reinforcement 100 of the peripheral stiffening element 10.

Along the short sides 8 and 9 of the food mold 1, the peripheral rim 5 has a greater width and forms two opposing gripping zones 11 and 12. In each of the two opposing gripping zones 11 and 12, the peripheral stiffening element 10 is edged externally by a respective peripheral strip 11a and 12a of material forming the food mold body 2. The peripheral strip 11a or 12a produces the increase in width of the gripping zone 11 or 12, and exhibits a flexibility significantly greater than that of the peripheral stiffening element 10.

In the embodiment illustrated in FIG. 4 in longitudinal cross section, it can be seen that the top main face 5a of the peripheral rim 5 is slightly oriented outward, such that it back from the common access face 4, and such that the gripping zones 11 and 12 extend slightly obliquely downward, that is to say toward the bottom 3a of the cells 3. In this way, the gripping of the food mold 1 is facilitated, during a horizontal pulling movement for example to take the food mold out of an oven: it is then sufficient to apply the end of fingers of a hand under a gripping zone 11 or 12, supporting the gripping zone 11 or 12 and pulling it toward the outside of the oven in order to slide the food mold 1 out of the oven (arrow F1).

Considering the embodiment of FIGS. 1 to 6 again, it can be seen that the food mold 1 further comprises two intermediate stiffening elements 101 and 102, each joining two opposing zones of two long sides of the peripheral stiffening element 10. In practice, as illustrated in FIG. 6, the intermediate stiffening elements 101 and 102 join opposing zones of two long sides of the continuous annular reinforcement 100, being parallel to the short sides of the continuous annular reinforcement 100. As will be understood from FIGS. 1 and 3, the intermediate stiffening elements 101 and 102 divide the common access face 4 into three transverse strips having mutually similar surface areas, each of the transverse strips comprising 8 cells in the embodiment illustrated. In all cases, the intermediate stiffening elements 101 and 102 are also embedded in the mold body material.

As can be seen more distinctly in FIG. 6, in this embodiment, the peripheral stiffening element 10 is integral with beginnings of protuberances such as the beginning of protuberance 103, extending perpendicularly and away from the top face intended to be closest to the common access face 4 in FIGS. 1 to 5. The beginnings of protuberances 103 can for example be metal studs welded on the bottom face 10d of the continuous annular reinforcement 100. The square cross section of the continuous annular reinforcement 100 facilitates the welding operation. As illustrated in particular in FIG. 4, complementary metal structures 20 with U-shaped profile are fixed to the beginnings of protuberances 103, to form supporting feet 21.

The supporting feet 21 have a height slightly greater than the height of the cells 3, and are distributed at the periphery of the food mold 1, so that the food mold can rest on a bearing plane by the bottom end of the feet. 21, the bottoms 3a of the cells 3 being away from the bearing plane. The circulation of hot air is thus favored over the entire surface of the cells 3 in an oven.

It will be understood, from FIGS. 1 to 5, that the top main face of the food mold 1 is essentially coplanar with the common access face 4, which facilitates the leveling operations.

Figure 9:
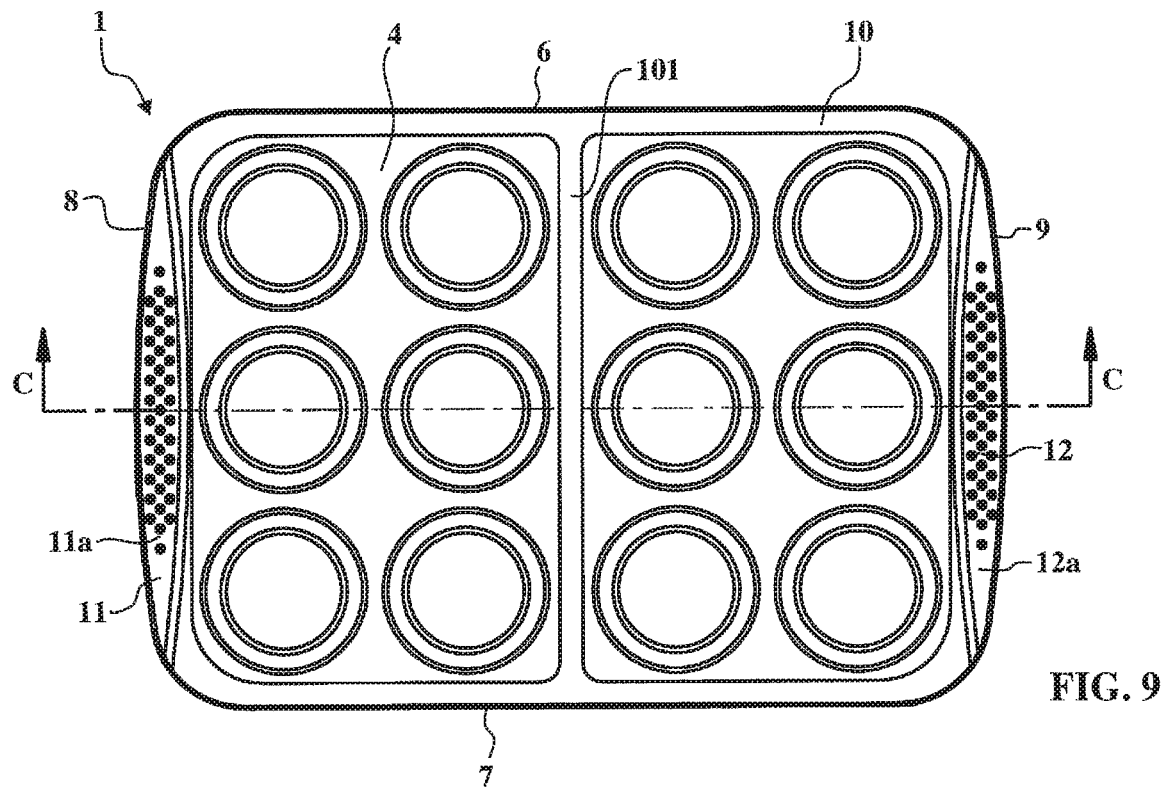
FIG. 9 is a plan view of a flexible food mold according to a second embodiment of the present invention.
Figure 10:
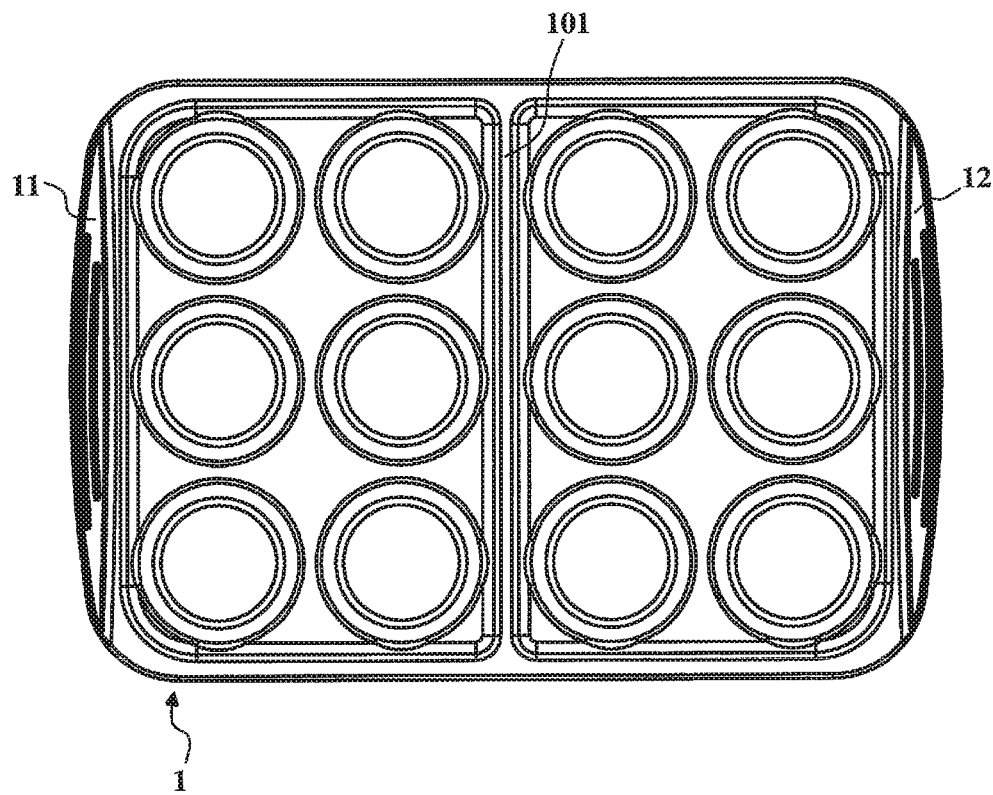
FIG. 10 is a bottom view of the flexible food mold of FIG. 9.

In the embodiment illustrated in FIGS. 9 and 10, the food mold 1 has no supporting feet. This is again a food mold for cooking or baking. The dimensions of this food mold 1 are smaller than those of the embodiment of FIGS. 1 to 6, its length being approximately 40 cm and its width being approximately 30 cm.

Another difference lies in the presence of a single intermediate stiffening element 101, dividing the common access face into two transverse strips having mutually similar surface areas, the intermediate stiffening element 101 remaining parallel to the short sides of the peripheral stiffening element 10.

Another difference lies in the cross section of the peripheral stiffening element 10, of square shape, 4 mm by 4 mm.

Figure 11:
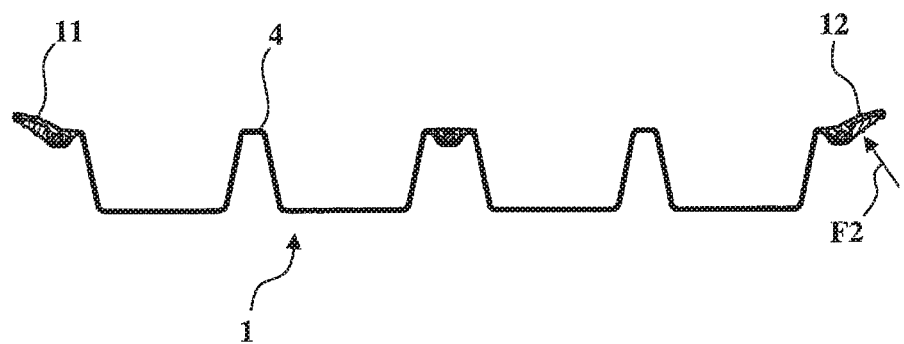
FIG. 11 is a front view in cross section along the line C-C of FIG. 9.

Another difference lies in the inclination of the gripping zones 11 and 12: in this second embodiment, as can be seen in FIG. 11, the top main face of the peripheral rim is slightly oriented inward, so that it extends slightly above the common access face 4, and so that the gripping zones 11 and 12 extend slightly obliquely upward. This embodiment is more suited to gripping with two hands, each hand being applied under one of the gripping zones 11 or 12, bearing both upward and toward the center of the food mold (arrow F2).

In another embodiment which is not shown in the drawings, the food mold according to the invention is similar to those illustrated in FIG. 1-6 or 9-11, with the difference that it has a single cell, and no intermediate stiffening elements.

In all the embodiments, there is an advantage to be gained in producing the stiffening elements in a carbon steel, exhibiting great rigidity.

Regarding the mold body material, it is essentially composed of a silicone elastomer based on polydimethylsiloxane with vinyl bonds, hot vulcanized in the presence of vulcanizing agents, colorant and treatment agents.

Figure 7:
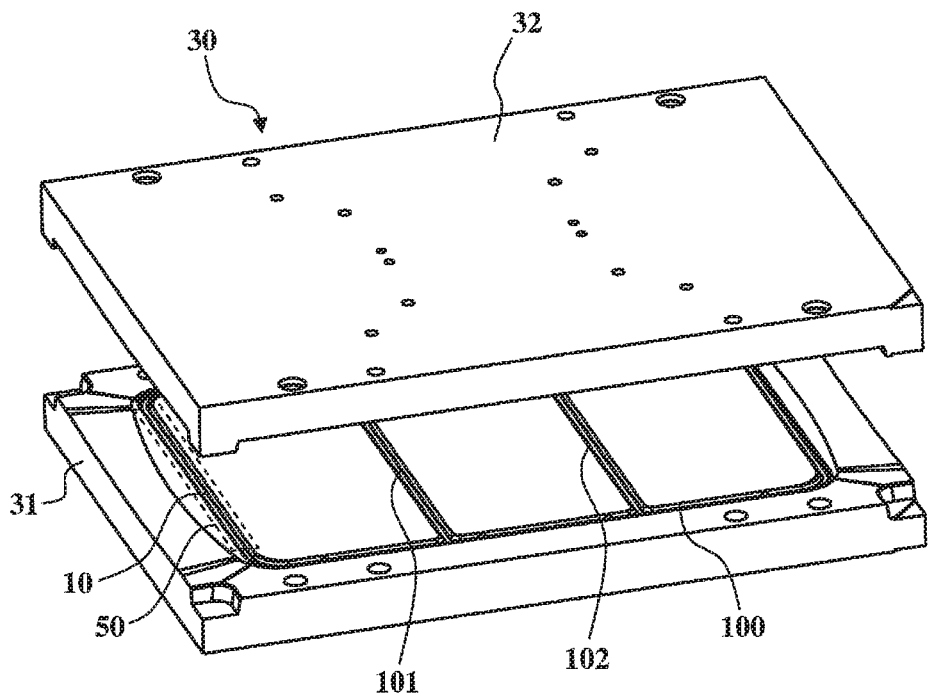
FIG. 7 is a perspective view of a first shaping mold for the overmolding of the peripheral stiffening element of FIG. 6, to illustrate the method according to the invention.
Figure 8:
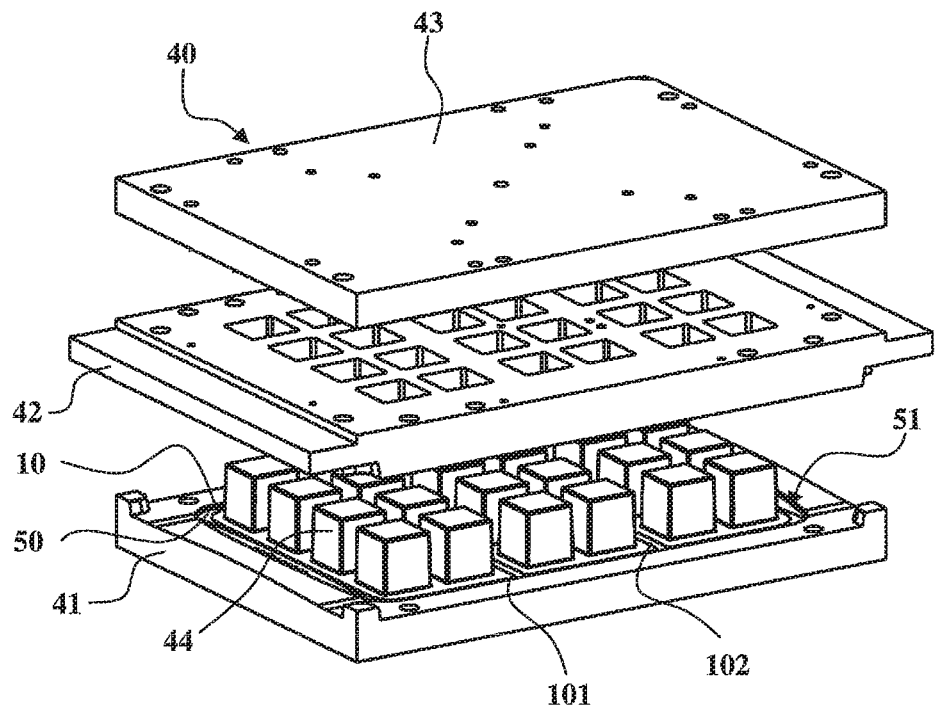
FIG. 8 is a perspective view of a second shaping mold for the production of the flexible food mold of FIG. 1, to illustrate the method according to the invention.

The method for producing a food mold as defined previously is now considered, this method being illustrated in relation to FIGS. 7 and 8.

In FIG. 7, a peripheral stiffening element 10 is first of all provided, having, if necessary, one or more intermediate stiffening elements 101 and 102, and this peripheral stiffening element 10 is placed in a first shaping mold 30 comprising a bottom mold element 31 and a top mold element 32.

Strips of a first molding silicone paste, such as the strip 50 illustrated by dotted lines, are applied to a first face of the peripheral stiffening element 10, namely its top face illustrated in FIG. 7, to cover almost all of said top face. In the presence of intermediate stiffening elements 101 and 102, strips of the first molding silicone paste are also applied to these intermediate stiffening elements 101 and 102.

Next, the first shaping mold 30 is closed to vulcanize the first molding silicone paste 50 and pressurize the assembly of stiffening elements 10, 101, 102 and first silicone paste thus obtained, and this assembly is heated in the first shaping mold 30 to produce an overmolding of the peripheral stiffening element 10 and, if necessary, of the intermediate stiffening element or elements 101 and 102 with the first molding silicone paste 50.

A pressure of 70 to 80 kg per square centimeter can be satisfactory. Heating to 180° C. for three minutes can be satisfactory, in the case of a cooking food mold whose outline has a size of 60×40 cm, and whose wall thickness is approximately 0.5 mm. A time and temperature adjustment will be able to made, as an increasing function of the thickness and of the size of the food mold to be produced.

After the opening of the first shaping mold 30 and cooling, the assembly of stiffening elements 10, 101, 102 and first molding paste 50 thus obtained is extracted from the first shaping mold 30, it is turned over and it is placed in a second shaping mold 40 illustrated in FIG. 8. This second shaping mold 40 comprises a base element 41, an intermediate element 42 and a top element 43. The first face of the peripheral stiffening element 10, overmolded by the first molding silicone paste 50, after turning over, is oriented downward against the base element 41 of the second shaping mold 40, whereas the second face of the peripheral stiffening element 10 is visible. The vulcanized first molding silicone paste 50 supports the stiffening element or elements 10, 101, 102 and itself constitutes the element ensuring the positioning of the stiffening element or elements 10, 101, 102 in the second shaping mold 40.

As illustrated by the arrow 51, there are arranged, on the second face of the peripheral stiffening element 10, and, if necessary, of the intermediate stiffening elements 101, 102, strips of a second molding silicone paste 51, in a volume equal to that of the wall of the food mold to be produced. As can be seen in FIG. 8, the base element 41 comprises protuberances 44 intended to penetrate into corresponding openings of the intermediate element 42, so as to form the walls of the cells. The bottoms of the cells are formed by the top element 43 coming to face the tops of the protuberances 44 of the base element 41. The second shaping mold 40 is then closed, so as to heat under pressure the assembly of stiffening elements 10, 101, 102 and first molding paste 50 and second molding paste 51 and thus produce the food mold body with the cells and the peripheral rim in which the peripheral reinforcement 10 and, if necessary, intermediate stiffening elements 101, 102, is/are embedded. A pressure of 70 to 80 kg per square centimeter can be satisfactory. Heating to 180° C. for three minutes can be satisfactory, in the case of a food mold whose outline has a size of 60×40 cm, and whose wall thickness is approximately 0.5 mm. A time and temperature adjustment will be able to be made, as an increasing function of the thickness and of the size of the food mold to be produced. The intermediate element 42 makes it easier to strip the mold, especially when the cells have a circular or polygonal cross section and a cylindrical peripheral wall.

Figure 12:
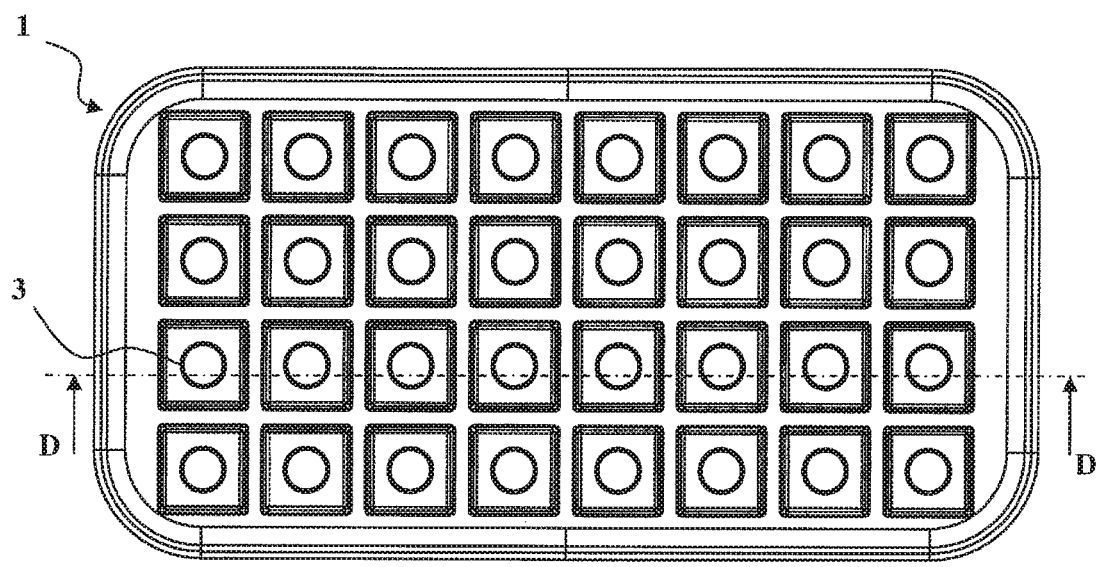
FIG. 12 is a plan view of a flexible food mold according to a third embodiment of the present invention.
Figure 13:
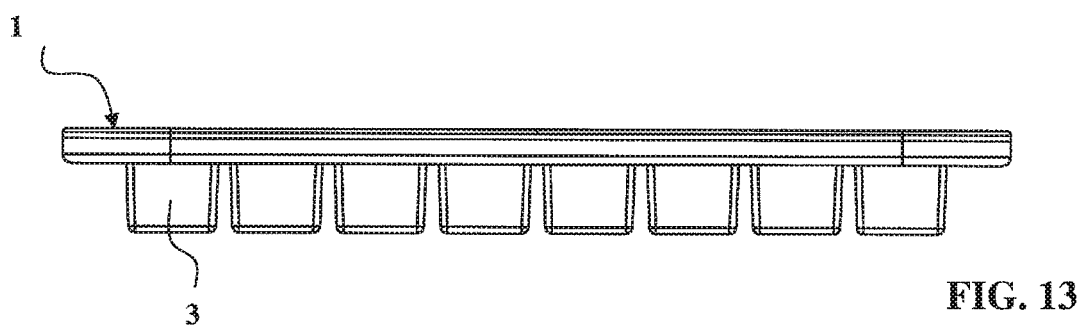
FIG. 13 is a front view of the flexible food mold of FIG. 12.
Figure 14:
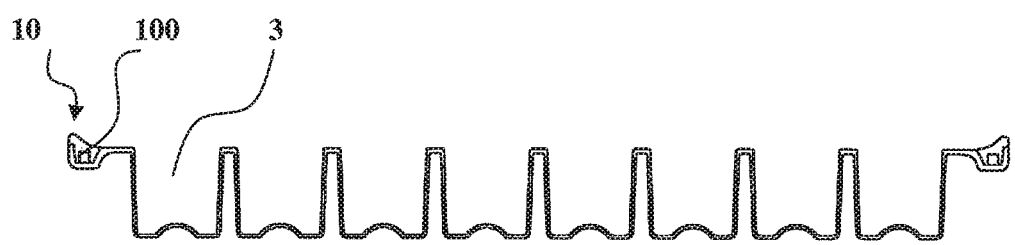
FIG. 14 is a front view in cross section along the line D-D of FIG. 12.

FIGS. 12-14 show a third embodiment of the food mold 1 according to the invention, in a form more especially appropriate for making ice cubes. The structure of that food mold 1 is similar to that of the above described embodiments, with several cells 3, and with a peripheral stiffening element 10 in the form of a continuous annular reinforcement 100 whose two cross section parts can be seen on FIG. 14.

Figure 15:
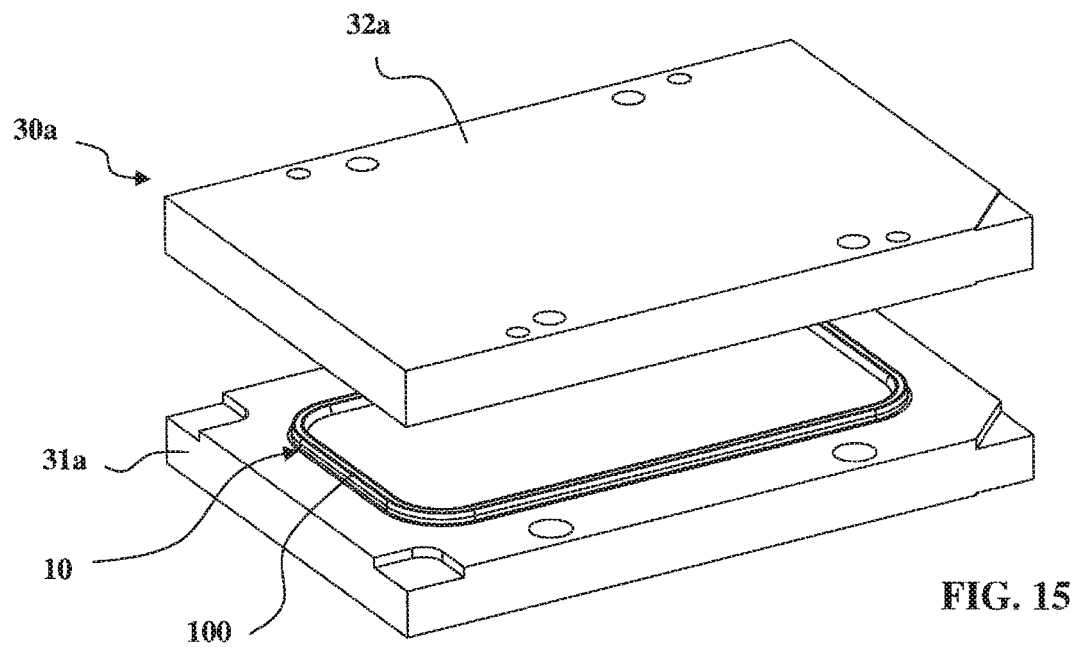
FIG. 15 is a perspective view of a first shaping mold for the overmolding of the peripheral stiffening element of the flexible food mold of FIG. 12.
Figure 16:
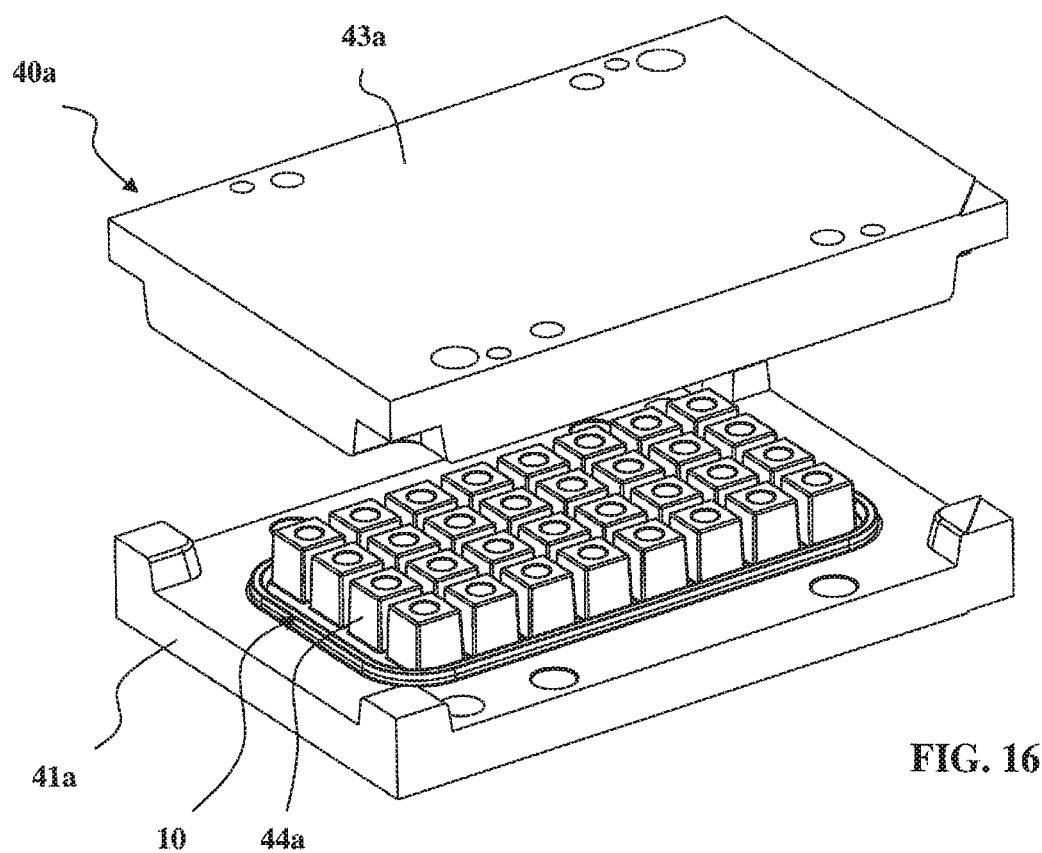
FIG. 16 is a perspective view of a second shaping mold for the production of the flexible food mold of FIG. 12.

As shown on FIG. 15, The peripheral stiffening element 10 is placed in a first shaping mold 30a comprising a bottom mold element 31a and a top mold element 32a, and strips of a first molding silicone paste are applied to a first face of the peripheral stiffening element 10. After closing the first shaping mold 30a, the assembly of stiffening element 10 and first silicone paste is overmolded through heating.

After opening the first shaping mold 30a and cooling, the assembly of stiffening element 10 and first molding paste is turned over and it is placed in a second shaping mold 40a illustrated in FIG. 15. This second shaping mold 40a comprises a base element 41a having protuberances 44a, and a top element 43a, without any intermediate element. This kind of shaping mold. 40a is appropriate for cells having a slightly tapered shape, wherein mold-stripping is rather easy. The remaining of the manufacturing process is as described above with FIG. 8.

According to a first possibility, which can be used with any of the above described embodiments, the first molding paste 50 and the second molding paste 51 can be identical, so as to produce a food mold whose wall has an outer appearance that is uniform and of the same color.

Alternatively, the first molding paste 50 can differ from the second molding paste 51 at least by its color so as to produce a food mold whose wall has an outer appearance with two distinct colors: the common access face 4 then comprises a peripheral strip having the color and appearance of the first molding paste 50 in line with the peripheral stiffening element 10, with, if necessary, one or more intermediate strips having the color and appearance of the first molding paste 50 in line with each intermediate stiffening element 101 or 102, whereas the rest of the wall of the food mold has the color and appearance of the second molding paste 51.

It will be noted that, should the food mold 1 comprise supporting feet 21, as in the embodiment of FIGS. 1 to 6, the first shaping mold 30 comprises housings receiving the beginnings of protuberances 103, preventing the overmolding thereof by the first silicone paste. Similarly, in this case, the intermediate element 42 of the second shaping mold 40 comprises housings receiving the beginnings of protuberances 103, to prevent the overmolding thereof by the second silicone paste. After mold-stripping of the second shaping mold 40, complementary metal structures 20 (FIG. 4) are fixed to the beginnings of protuberances 103 to produce the feet 21. This fixing can be ensured for example by gluing using a silicone glue.

It will be noted also that the food mold structure with supporting feet 21, as described previously and illustrated in relation to FIGS. 2, 5 and 6, in itself constitutes an invention which is independent from the manufacturing process, and that the applicant reserves the right to protect through one or more divisional applications.

It will be noted finally that the particular food mold structure with flexible gripping zones 11, 12, as described previously and illustrated in relation to FIGS. 4, 9, 10 and 11, in itself constitutes an invention independent from the manufacturing process, and that the application reserves the right to protect through one or more divisional applications.

The present invention is not limited to the embodiments which have been explicitly described, but it includes the miscellaneous variants and generalizations thereof contained within the scope of the claims hereinbelow.

The invention claimed is:

1. A food mold (1),
comprising a food mold body (2) made of a mold body material, having one or more cells (3) with flexible wall,
said one or more cells (3) being limited by a bottom (3a) and being open on a common access face (4),
the common access face (4) itself having a peripheral rim (5) extending radially outward from an inner edge (5d) marking a boundary with the cell or cells (3) and to a free outer edge (5c),
the peripheral rim (5) having a top main face (5a) and being provided with a peripheral stiffening element (10) in the form of a continuous annular reinforcement (100),
wherein:
the peripheral stiffening element (10) is entirely embedded in the mold body material,
around the peripheral stiffening element (10), the mold body material has no through passages free or blocked between the peripheral stiffening element (10) and an outer surface of the mold body material, and
the peripheral stiffening element (10) is edged externally, in at least two opposing gripping zones (11, 12) of the peripheral rim (5), by a peripheral strip (11a, 12a) of material forming the food mold body, said peripheral strip (11a, 12a) producing an increase in width of the gripping zones (11, 12) and exhibiting a greater flexibility than that of the peripheral stiffening element (10).

2. The food mold (1) as claimed in claim 1, wherein the food mold body (2) is made of a silicone-based material, of food quality, whereas the peripheral stiffening element (10) is made of metal.

3. The food mold (1) as claimed in claim 1, wherein, in the two opposing gripping zones (11, 12) of the peripheral rim (5), the top main face (5a) of the peripheral rim (5) is slightly oriented outward, so that it is set back from the common access face (4), and so that the gripping zones (11, 12) extend slightly obliquely downward.

4. The food mold (1) as claimed in claim 1, wherein, in the two opposing gripping zones (11, 12) of the peripheral rim (5), the top main face (5a) of the peripheral rim (5) is slightly oriented inward, so that it extends slightly above the common access face (4), and so that the gripping zones (11, 12) extend slightly obliquely upward.

5. The food mold (1) as claimed in claim 1, wherein it further comprises several cells and at least one intermediate stiffening element (101, 102), joining opposing zones of the peripheral stiffening element (10), and entirely embedded in the material forming the food mold body between adjacent cells.

6. The food mold (1) as claimed in claim 5, wherein the food mold body (2) has a rectangular outline, wherein the peripheral stiffening element (10) has two opposite long sides and two opposite short sides, and wherein said at least one intermediate stiffening element (101, 102) joins opposing zones of the two long sides of the peripheral stiffening element (10).

7. The food mold (1) as claimed in claim 6, wherein the food mold body (2) has an outline whose length is approximately 60 cm and width is approximately 40 cm, with two intermediate stiffening elements (101, 102) joining respective opposing zones of the two long sides of the peripheral stiffening element (10), the intermediate stiffening elements (101, 102) being parallel to the short sides of the peripheral stiffening element (10) and dividing the common access face (4) into three transverse strips having mutually similar surface areas.

8. The food mold (1) as claimed in claim 7, wherein the peripheral stiffening element (10) has a cross section of square shape, 6 mm×6 mm, made of carbon steel.

9. The food mold (1) as claimed in claim 6, wherein the food mold body (2) has an outline whose length is approximately 40 cm and width is approximately 30 cm, with an intermediate stiffening element (101) joining respective opposing zones of the two long sides of the peripheral stiffening element (10), the intermediate stiffening element (101) being parallel to the two short sides of the peripheral stiffening element (10) and dividing the common access face (4) into two transverse strips having mutually similar surface areas.

10. The food mold (1) as claimed in claim 9, wherein the peripheral stiffening element (10) has a cross section of square shape, 4 mm by 4 mm, made of carbon steel.

11. The food mold (1) as claimed in claim 1, wherein the peripheral stiffening element (10) is integral with protuberances (103, 20) extending perpendicularly and away from the common access face (4), beyond the bottom (3a) of the cells (3), to constitute supporting feet (21) by which the food mold (1) can rest on a bearing plane while keeping the bottom (3a) of the cells away from the bearing plane.

* * * * *

(12) EX PARTE REEXAMINATION CERTIFICATE (202nd)

Ex Parte Reexamination Ordered under 35 U.S.C. 257

United States Patent
Viancin

(10) Number: US 10,596,729 C1
(45) Certificate Issued: Dec. 29, 2021

(54) METHOD FOR MANUFACTURING A FLEXIBLE MOLD WITH PERIPHERAL STIFFENER, AND MOLD RESULTING FROM SAID METHOD

(71) Applicant: Jean-Charles Viancin, Hong Kong (HK)

(72) Inventor: Jean-Charles Viancin, Hong Kong (HK)

Supplemental Examination Request:
No. 96/000,361, Jun. 2, 2021

Reexamination Certificate for:
Patent No.: 10,596,729
Issued: Mar. 24, 2020
Appl. No.: 15/415,962
Filed: Jan. 26, 2017

(30) Foreign Application Priority Data

Jan. 28, 2016 (FR) ..................... 16 50676

(51) Int. Cl.
*B29C 33/38* (2006.01)
*A21B 3/13* (2006.01)
*A23P 30/10* (2016.01)
*B29C 43/02* (2006.01)
*B29K 83/00* (2006.01)
*B29L 31/00* (2006.01)

(52) U.S. Cl.
CPC .......... *B29C 33/3842* (2013.01); *A21B 3/132* (2013.01); *A21B 3/136* (2013.01); *A21B 3/138* (2013.01); *A23P 30/10* (2016.08); *B29C 43/021* (2013.01); *B29C 2043/023* (2013.01); *B29K 2083/00* (2013.01); *B29K 2995/0082* (2013.01); *B29L 2031/757* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,361, please refer to the USPTO's public Patent Application Information Retrieval (PAIR) system under the Display References tab.

*Primary Examiner* — Elizabeth L McKane

(57) ABSTRACT

A food mold includes a food mold body made of a mold body material, having one or more cells with flexible wall, the cells being open on a common access face itself having a peripheral rim extending radially outward from an inner edge, marking the boundary with the cell or cells and to a free outer edge, the peripheral rim being provided with a peripheral stiffening element in the form of a continuous annular reinforcement with, if necessary, one or more intermediate stiffening elements. The peripheral stiffening element is entirely embedded in the mold body material. Around the peripheral stiffening element, the mold body material has no through passages free or blocked between the peripheral stiffening element and the outer surface of the material.

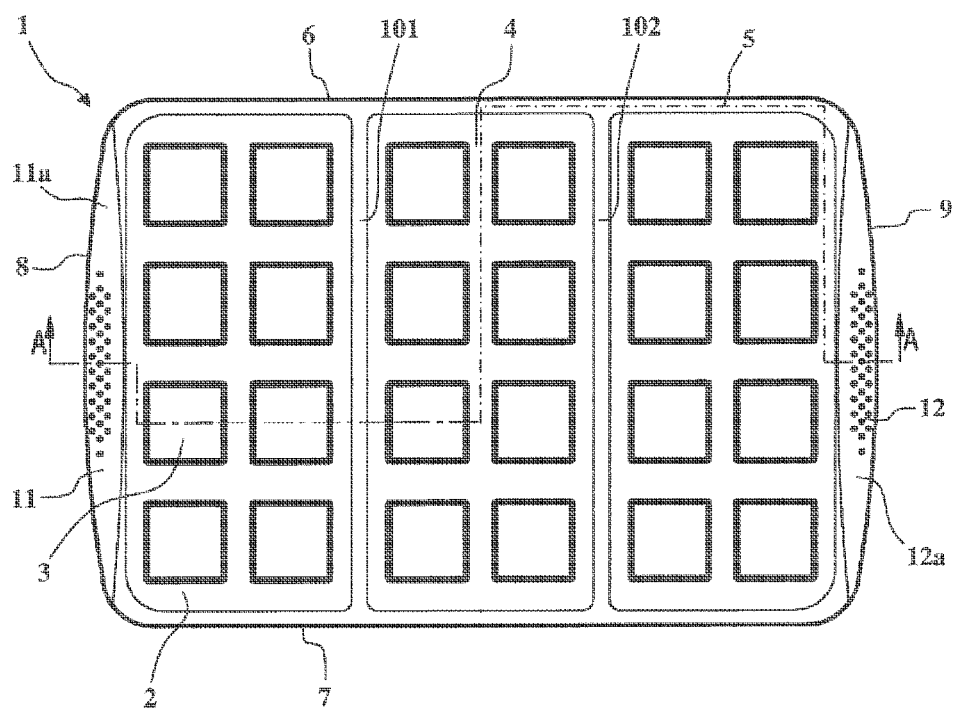

US 10,596,729 C1

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claim 1 is determined to be patentable as amended.

Claims 2-4, dependent on an amended claim, are determined to be patentable.

New claims 12-14 are added and determined to be patentable.

Claims 6-11 were not reexamined.

1. A food mold (1),
comprising a food mold body (2) made of a mold body material, having [one or more] *a plurality of* cells (3) with flexible [wall] *walls*,
said [one or more] *plurality of* cells (3) being limited by a bottom (3*a*) and being open on a common access face (4),
the common access face (4) itself having a peripheral rim (5) extending radially outward from an inner edge (5*d*) marking a boundary with the [cell or] *plurality of* cells (3) and to a free outer edge (5*c*),
the peripheral rim (5) having a top main face (5*a*) and being provided with a peripheral stiffening element (10) in the form of a continuous annular reinforcement (100), *and*
*at least one intermediate stiffening element (101, 102) joining opposing zones of the peripheral stiffening element (10),*
wherein:
the peripheral stiffening element (10) is entirely embedded in the mold body material,
*the at least one intermediate stiffening element (101, 102) is entirely embedded in the material forming the food mold body between adjacent cells,*
around the peripheral stiffening element (10), the mold body material has no through passages free or blocked between the peripheral stiffening element (10) and an outer surface of the mold body material, and
the peripheral stiffening element (10) is edged externally, in at least two opposing gripping zones (11, 12) of the peripheral rim (5), by a peripheral strip (11*a*, 12*a*) of material forming the food mold body, said peripheral strip (11*a*, 12*a*) producing an increase in width of the gripping zones (11, 12) and exhibiting a greater flexibility than that of the peripheral stiffening element (10).

*12. The food mold of claim 1, made by a process comprising:*

*providing a peripheral stiffening element (10) in the form of a continuous annular reinforcement (100) and the at least one intermediate stiffening element (101, 102),*

*applying a first molding paste (50) on a first face of the peripheral stiffening element (10) and a first face of the at least one intermediate stiffening element (101, 102),*

*heating under pressure the peripheral stiffening element (10), the at least one intermediate stiffening element (101, 102) and the first molding paste (50) in a first shaping mold (30) producing an overmolding of the first face of the peripheral stiffening element (10) and the at least one intermediate stiffening element (101, 102) with the first molding paste (50), then leaving to cool,*

*turning over the peripheral stiffening element (10), the at least one intermediate stiffening element (101, 102) and the first molding paste (50) and arranging, on the second face of the peripheral stiffening element (10) and the at least one intermediate stiffening element (101, 102), strips of a second molding paste (51) in a volume equal to that of the wall of the food mold to be produced,*

*placing the peripheral stiffening element (10), the at least one intermediate stiffening element (101, 102), the first molding paste (50), and the second molding paste (51) in a second shaping mold (40) and heating them under pressure to produce the food mold body (2) with the peripheral stiffening element (10) and the at least one intermediate stiffening element (101, 102) entirely embedded in the molding paste (50, 51), then leaving to cool.*

*13. The food mold (1) of claim 12, wherein the food mold comprises supporting feet (21), wherein:*

*the continuous metal annular reinforcement (100) comprises integral beginnings of metal protuberances (103),*

*the first shaping mold (30) comprises housings receiving the beginnings of protuberances (103), preventing the overmolding thereof by the molding paste during the heating under pressure of the assembly consisting of the peripheral stiffening element (10) and the first molding paste (50),*

*the second shaping mold (40) comprises housings receiving the beginnings of protuberances (103), preventing the overmolding thereof by the molding paste during the heating under pressure of the assembly consisting of the peripheral stiffening element (10) and the first and second molding pastes.*

*14. The food mold (1) of claim 13, wherein, after the mold-stripping of the second shaping mold (40), complementary metal structures (20) are fixed to the beginnings of protuberances (103), producing the supporting feet (21).*

\* \* \* \* \*